UNITED STATES PATENT OFFICE.

GEORGE C. BAILEY, OF WOODCLIFF-ON-HUDSON, NEW JERSEY, ASSIGNOR TO THE BARRETT COMPANY, A CORPORATION OF NEW JERSEY.

PURIFICATION OF MALEIC ACID BY REDUCING AGENTS.

1,401,937.   Specification of Letters Patent.   Patented Dec. 27, 1921.

No Drawing.   Application filed November 9, 1920.   Serial No. 422,794.

*To all whom it may concern:*

Be it known that I, GEORGE C. BAILEY, a citizen of the United States, residing at Woodcliff-on-Hudson, in the county of Hudson and State of New Jersey, have invented certain new and useful Improvements in Purification of Maleic Acid by Reducing Agents, of which the following is a specification.

The object of this invention is to purify maleic acid, especially that produced by the catalytic oxidation of benzene, or that in which benzoquinone is present as an impurity.

In the catalytic oxidation of benzene to maleic acid as disclosed in U. S. Patent No. 1,318,633 to Weiss and Downs, benzoquinone is one of the products of the oxidation. Without intending to commit myself to any definite theory of the reaction I will state that the course of the oxidation appears to be conversion of the benzene into benzoquinone and the further oxidation of this quinone to maleic acid. The amount of benzoquinone escaping from the catalytic mass will depend upon the conditions chosen for the oxidation. With less energetic conditions of oxidation, for example with lower catalyst temperatures or diminshed amounts of air compared to benzene the amount of benzoquinone appears to increase in comparison to the maleic acid and with more energetic conditions of oxidation less benzoquinone is formed. It has been found that even with high conversion of benzene to maleic acid some benzoquinone is always formed. The ratio, as has been found by experiment, is often in the neighborhood of 10 parts of maleic acid to 1 of benzoquinone.

It is well known that benzoquinone in an acid solution when exposed to oxygen becomes dark colored and is finally decomposed into black products, from which the benzoquinone is not readily, if at all, capable of regeneration. These products have the property of imparting a dark color to white solids that are mixed with them, and this color is not readily removed.

In practising the process for the catalytic oxidation of benzene the vapors from the catalyst chamber are caused to pass into a condenser, which usually contains some absorbent liquid such as water, in which the maleic acid produced is scrubbed out of the vapors. Hence in this condenser maleic acid and benzoquinone are collected in a water solution, and through or over this solution the excess air from the converter is passed. These are favorable conditions for the conversion of the benzoquinone into the dark colored products whose compositions are unknown to me. When the maleic acid is regained by evaporation of the aqueous solution this dark color is imparted to the acid, from which it is very difficult to remove. Most boneblacks fail to remove it. Recrystallization of the maleic acid likewise does not yield white material. It is not practical to extract maleic acid from the water solution by solvents immiscible in water such as ether, as the acid is very readily soluble in water. Moreover these solvents, such as ether, do not remove the dark color from the acid solutions. Also a very slight trace of these impurities will darken the otherwise white maleic acid and interferes with the marketing of the product. The method described in this application overcomes these obstacles and renders the purification of the acid comparatively easy, besides regaining a valuable by-product.

It is a known chemical reaction that benzoquinone may be reduced by various reagents to hydroquinone. Nascent hydrogen such as from tin and hydrochloric acid, sulfur dioxid, sodium hydrosulfite and many other reagents will accomplish this reaction. Upon this reaction is based the present method of purification. The exact details may be carried on in a number of different ways.

For example, gaseous sulfur dioxid may be introduced into the water of the receiver into which is passed the vapor stream containing benzoquinone, maleic acid and other gases such as carbon dioxid, nitrogen, oxygen, etc., and the sulfur dioxid continually bubbled into the receiver in slight excess of the stoicheiometric proportion to the amount of quinone formed per hour. The excess of sulfur dioxid reduces the benzoquinone according to this equation:

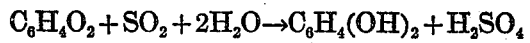
$$C_6H_4O_2 + SO_2 + 2H_2O \rightarrow C_6H_4(OH)_2 + H_2SO_4$$

The excess $SO_2$ in the liquor also prevents the hydroquinone from being oxidized to undesirable products and any $SO_2$ escaping with the exit gases may be caught in a proper absorbing medium. At the end of the run the hydroquinone may be extracted from the water solution by known methods such as extraction by ether and the maleic acid freed from the danger of contamination by the benzoquinone oxidation products may be obtained in a pure state.

A similar result may be achieved by using in the receiver an aqueous solution or suspension of a sulfite or acid sulfite such as sodium or calcium. The maleic acid upon coming in contact with such a solution liberates sulfur dioxid and forms a salt of the metal used. The sulfur dioxid liberated reduces the benzoquinone to hydroquinone according to the above equation. By proper regulation of the amount of sulfite charged the acid salts of maleic acid may be formed and these crystallize readily from aqueous solution in a very pure state. The excess $SO_2$ is caught in soda ash or lime and the sulfite formed charged to the receiver in a subsequent run. The mother liquors, after filtering off the acid salt may be extracted for hydroquinone.

Other reducing agents may be used and the applicant is not limited to the examples cited.

It is important that the reducing agent be present in the receiver as soon as the vapors are passed into the receiver and be present in slight excess over that required for the reduction of the benzoquinone during the run, because the benzoquinone, if allowed to collect in the receiver soon decomposes into the dark decomposition products, which are not markedly affected by the reducing agents. If, however, the benzoquinone is reduced to hydroquinone as soon as the vapors reach the absorbing liquid and the hydroquinone thus prevented from oxidation by an excess of the reducing agent, none of the decomposition products are formed.

I claim:

1. The process of purifying maleic acid, which comprises treating a mixture of maleic acid and benzoquinone with a reducing agent.

2. The process of purifying maleic acid, which comprises treating a solution of maleic acid containing benzoquinone with an excess of $SO_2$.

3. In the process of purifying maleic acid, the steps which comprise treating an aqueous solution of maleic acid containing benzoquinone with an alkaline sulfite.

4. The herein described process which comprises passing the reaction products from the catalytic oxidation of benzene in the vapor phase to produce maleic acid into a receiver, and passing a reducing agent into said receiver.

5. The herein described process which comprises passing the reaction products from the catalytic oxidation of benzene in the vapor phase to produce maleic acid into a receiver, and simultaneously passing $SO_2$ into said receiver.

6. The herein described process which comprises passing the reaction products from the catalytic oxidation of benzene in the vapor phase to produce maleic acid into a receiver, and simultaneously passing a sulfite into said receiver.

7. The herein described process which comprises treating the reaction products from the catalytic oxidation of benzene in the vapor phase to produce maleic acid with a reducing agent.

8. The herein described process which comprises treating the reaction products from the catalytic oxidation of benzene in the vapor phase to produce maleic acid with $SO_2$.

9. The process which comprises treating a solution comprising maleic acid and benzoquinone with a reducing agent and recovering the hydroquinone thus formed.

In testimony whereof I affix my signature.

GEORGE C. BAILEY.